United States Patent [19]
Logan

[11] 3,721,176
[45] March 20, 1973

[54] BEVERAGE BREWING APPARATUS

[76] Inventor: Malcolm Logan, 535 Noble Street, Chicago, Ill. 60622

[22] Filed: April 15, 1971

[21] Appl. No.: 134,147

[52] U.S. Cl............................................99/280, 99/310
[51] Int. Cl...........................................A47j 31/00
[58] Field of Search........99/280, 281, 282, 283, 302, 99/302 P, 307, 308, 310, 312, 313, 314, 315, 284; 417/417

[56] References Cited

UNITED STATES PATENTS

| 2,552,169 | 5/1951 | Graham | 99/282 |
| 3,391,632 | 7/1968 | Colonna | 99/310 |
| 2,025,302 | 12/1935 | Olds | 99/310 |
| 1,175,619 | 3/1916 | Dewey | 99/310 |

Primary Examiner—Robert W. Jenkins
Attorney—Samuel W. Kipnis

[57] ABSTRACT

Beverage brewing apparatus of the character having a container for water and a basket to contain ground coffee. It also includes a flow stem supporting the basket, at the lower end of which there is an electrically actuated pump operable to cause fluid to flow upwardly through the flow tube and spill over into the basket. Suitable means is provided for heating the water to brew the coffee or to re-heat same.

11 Claims, 5 Drawing Figures

PATENTED MAR 20 1973

Inventor:
Malcolm Logan
Samuel W. Kipnis
Atty.

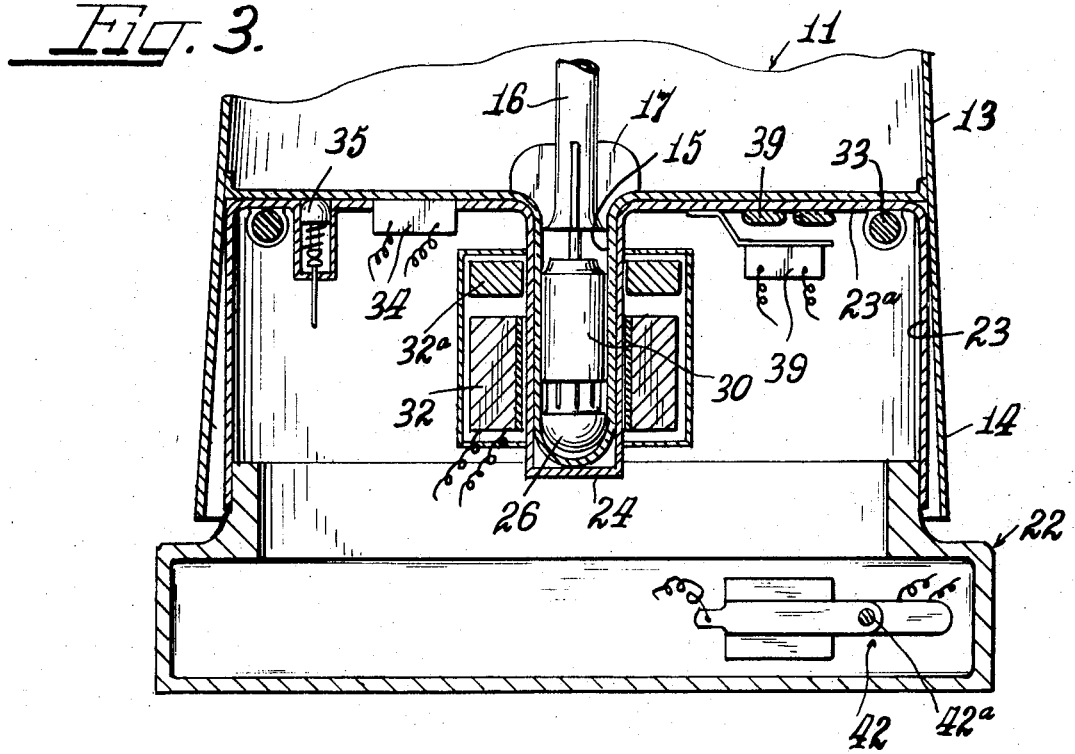
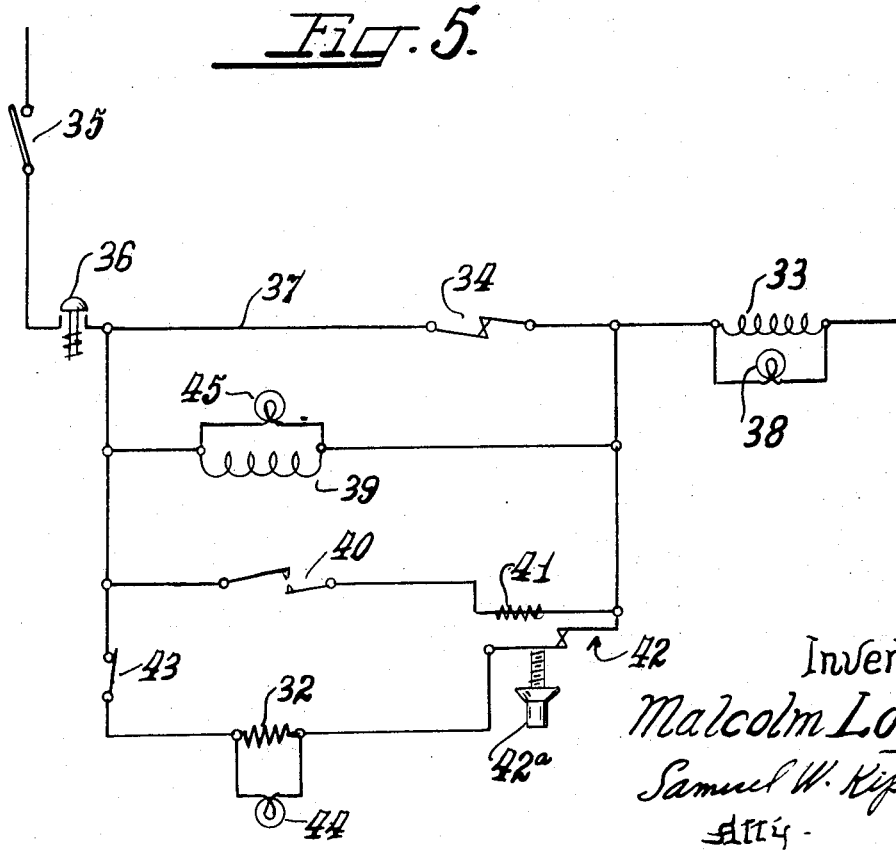

BEVERAGE BREWING APPARATUS

The invention relates to improvements in beverage brewing apparatus and particularly to apparatus for brewing coffee. The coffee maker is embodied in the form of a container for water to be heated and having therein the customary basket to receive ground coffee arranged on the upper end of a flow tube. The lower end of said flow tube includes an electrically activated pump which functions, when the water is heated to a predetermined temperature, to pump a substantially continuous stream of water up the flow tube and into the basket, without boiling.

The water container, broadly described above, is removably seated upon a base element which contains all of the electric components and electric wiring, including heater elements, thus rendering it possible to immerse the water container in water for purposes of cleaning without damage to the electrical components.

It is therefore an object of the invention to provide apparatus of the character referred to.

Another object is to provide a novel pump mechanism for beverage brewing apparatus without boiling as in percolators.

Another object is to provide an automatic coffee maker wherein the fluid container is separable from a base containing the electrical components.

Another object is to provide a novel assemblage of electrical components for association with a coffee maker.

Another object is to provide a coffee maker of the character referred to which is not expensive or difficult to manufacture and one that is very efficient in use.

Other objects and advantages of the invention will become apparent with reference to the following description and accompanying drawing.

In the drawing:

FIG. 3 is a vertical central sectional view through the base showing the container mounted thereon, in section.

FIG. 5 is a schematic view of the electric circuitry.

Figure 1:
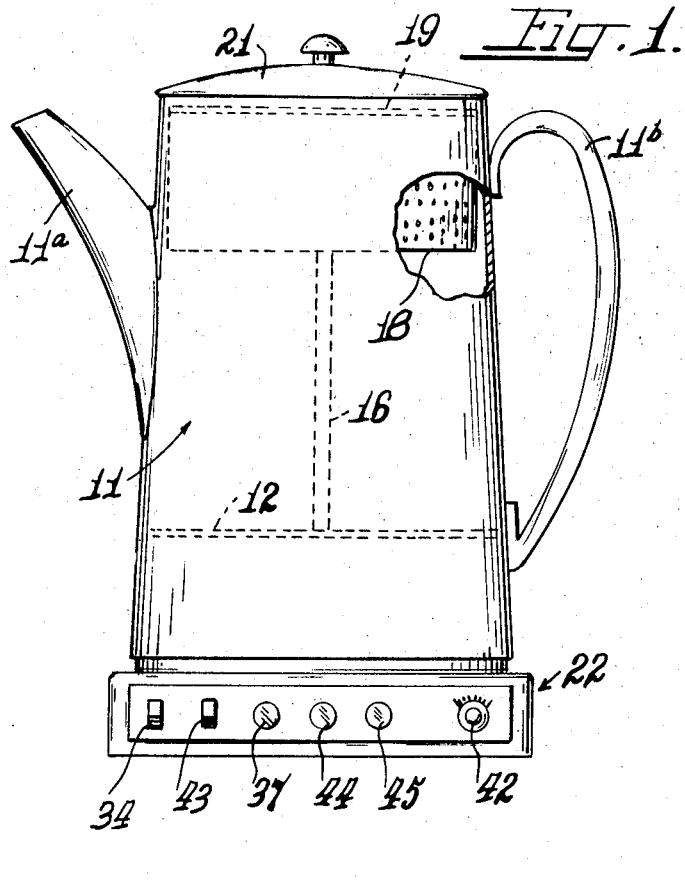
FIG. 1 is an elevational view of the beverage brewing apparatus.

Referring to the exemplary disclosure of the invention as illustrated in the accompanying drawings, the apparatus comprises a relatively deep container or vessel 11, including a pouring spout 11a and a handle 11b, adapted to contain water in a quantity required to brew a desired amount of beverage. The container 11 has its bottom wall 12 spaced inwardly from the bottom of its peripheral side wall 13 so as to provide a depending annular skirt 14. The bottom wall is formed with an axially located well 15 which affords a seat for the lower end of a removable flow tube 16 having pump mechanism components, to be described presently, arranged on its lower end.

In order to stabilize the mounting and limit insertion of the flow tube 16 in the well 15, said tube is provided adjacent its lower outwardly flared end with webs 17 arranged in cross formation so as not to obstruct the flow of water through the tube. Each web is formed with a downwardly facing shoulder 17a adapted to seat on the inside or upper surface of the container bottom wall 12. The upper end of said flow tube mounts a basket or other perforated container 18 for ground coffee. A perforated cover 19 may be arranged over the open upper end of the basket and the container 11 may be closed by a removable lid 21.

Figure 2:
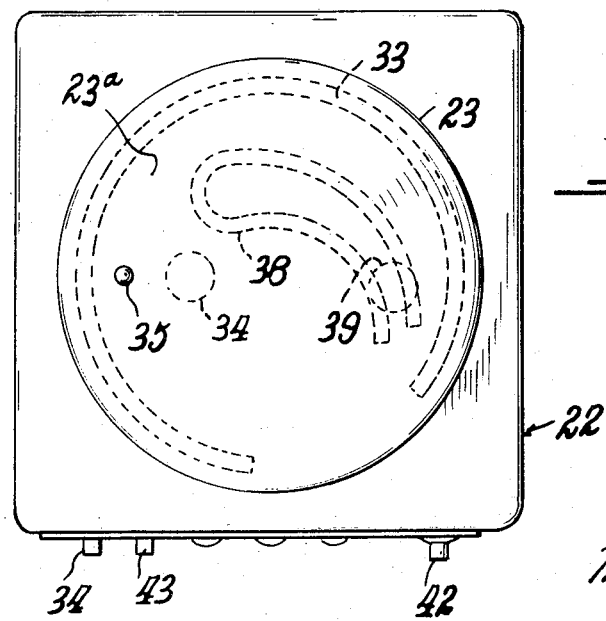
FIG. 2 is a top plan view of the base.

The container 11 is adapted, when brewing or reheating its contents, to be seated upon a base 22, in thermal contact therewith. As best shown in FIGS. 2 and 3, this base comprises a hollow shell 23 formed with a reduced diameter on its upper end that is sized to receive the container skirt 14 nested thereover. Its top wall 23a has an axial tubular recess or core 24 into which the well 15 of the container bottom 12 extends. Although the wall of well 15 is loosely contained in the recess 24 there is a relatively close fit all for the purpose to become apparent presently.

Figure 4:
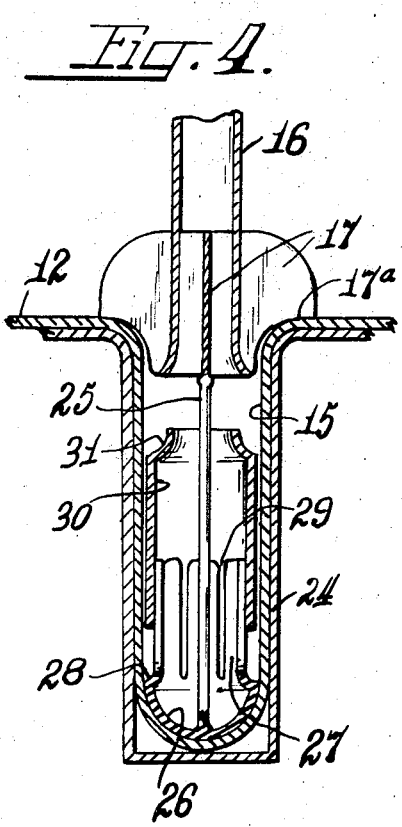
FIG. 4 is an enlarged axial sectional view of the pump mechanism.

The pump mechanism previously referred to and best shown in FIG. 4, is carried on the lower end of the flow tube 16 and is comprised of a stem 25 secured firmly at its upper end to the intersection of the cross webs 17 and carrying firmly on its lower end a cup 26, the bottom wall of which preferably is rounded as shown. Its peripheral wall 27 is slotted, preferably, and it is offset inwardly from the rim of the bottom wall so as to provide an upwardly facing shoulder 28.

Telescopically fitted over the peripheral wall 27 of the cup 26 is a hollow reciprocable tubular piston 30, the upper end of which is constricted, as at 31, to a diameter that responds substantially to the diameter of the flared bottom end of flow tube 16. The piston has a sliding fit within the well 15. The length of said piston 30 is substantially less than the spacing between the lower end of the flow tube and the cup shoulder 28 thus enabling the piston to reciprocate between these two stops.

In operation of the pump, by means to be described presently, water in the container flows down into the well 15 past the tubular piston 30 and through the slotted wall 27 of cup 26 into the interior of the tubular piston. When the piston is moved downwardly from its uppermost position, water trapped therein is ejected upwardly through the restricted open upper end of the tubular piston and into the flow tube 16. When the tubular piston moves upwardly, water entrapped between its restricted upper end and the flared lower end of the flow tube, is pushed upwardly into the flow tube. Thus, it will be seen that during pump operation there is a substantially steady stream of water flowing up the flow tube to be spilled out of its top over the coffee in the basket, without boiling.

The motivating force for reciprocating the tubular piston 30 comprises an electro-magnet 32 having a permanent magnet 32a associated with it. These magnets are arranged firmly around the tubular recess or core 24 and, when excited by alternating current they will activate the tubular piston causing it to reciprocate between tube 16 and cup shoulder 28 and pump water up tube 16. This pumping operation occurs only when the water is heated. To this end there is provided in the base just below its top wall 23a a 1,000 watt calrod heater 33, having in its circuit to a source of electric current, a disc thermostat switch 34 set to break the circuit at about 210° and to close at a temperature of about 140°. When a main on-off switch 35 (see FIG. 5) is closed, and the container is seated on the base so as to depress and close a tip switch 36 mounted in the base top wall 23a, all current flows directly through a line 37 to closed thermostatic switch 34 and to calrod 33. Preferably a lamp 38 is connected in parallel with the calrod. Thus, when the water reaches a temperature of about 210° the disc thermostatic switch 34 opens and cuts off current to the calrod.

The current continues to flow to a low wattage heater 39 (about 50 watts) and to the pump coil 32 causing water to be pumped up the flow tube 16. This condition remains for about 3 minutes when the heat from the low wattage heater 39 causes a thermo switch 40 to close to energize a heater coil 41 on the thermal timer switch 42 causing it to open and stop the pump. This involves a time period of from 1 to 3 minutes depending upon the setting of a strength control knob 42a on the front face of the base. The low wattage heater 39 remains on to keep the brew warm. When the container is removed for pouring, the tip switch 36 opens and all current to the system is cut off.

Now, when the brew is to be re-heated, the container is replaced on the base, closing tip switch 36 and, a normally closed brew switch 43, available on the outside of the base, is opened manually to cut off current to the pump. The 50 watt heater 39 is then re-energized to heat the brew while the pump remains inactive.

Preferably a lamp 44 is connected in parallel with the pump coil 32 to give visual indication that it is on or off and also a lamp 45 is connected in parallel with the re-heat coil 39. These lamps 38, 44 and 45 are preferably of different colors, such as red, green and yellow and are visible from the front side of the base.

Although I have described a preferred embodiment of my invention in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:

1. In an automatic beverage brewing apparatus, the combination of a base, a container for beverage grounds and water removably seated on said base in thermal contact therewith, a high wattage heater element in said base, an electric reciprocating pump in said container for delivering hot water to the beverage grounds for brewing the beverage, a low wattage heater element in said base, and automatic temperature control means for said heaters.

2. The apparatus recited in claim 1, in which thermostatic switch means is provided in the circuit to the electric pump.

3. The apparatus recited in claim 1, in which manual switch means opens the circuit to the pump when the low wattage heater is on.

4. The apparatus recited in claim 1, in which means is provided to open the circuit to the pump when a predetermined water temperature is attained.

5. The apparatus recited in claim 1, in which a basket is provided in the container for the beverage grounds and the pump has flow communication with said basket through a flow tube.

6. The apparatus recited in claim 1 in which the electric circuit to said heaters includes a tip switch adapted to be closed when the container is seated on said base.

7. In an automatic beverage apparatus including a water container having a bottom wall, a well in said bottom wall, an electrically driven pump in said well, said pump including a magnetically actuated reciprocating piston, and a flow tube associated with said pump and adapted to receive liquid delivered to it from the container by said pump.

8. The apparatus recited in claim 7, in which the pump includes a stationary element spaced from the bottom end of the flow tube and seated in said well, and between which the piston reciprocates.

9. The apparatus recited in claim 7, wherein the reciprocating piston is contained in a stationary hollow care, and an electro-magnet is arranged around said core and is operable to impart reciprocation to said piston when alternating electric current is applied thereto.

10. The apparatus recited in claim 9, in which a permanent magnet is associated with the electro-magnet and surrounds the core.

11. The apparatus recited in claim 7, in which the flow tube and pump are integrally connected.

* * * * *